(12) United States Patent
Ginestet

(10) Patent No.: US 11,767,244 B2
(45) Date of Patent: Sep. 26, 2023

(54) REACTOR AND METHOD FOR BIOLOGICAL TREATMENT OF WASTEWATER

(71) Applicant: SUEZ INTERNATIONAL, Paris (FR)

(72) Inventor: Philippe Ginestet, Chateaufort (FR)

(73) Assignee: SUEZ INTERNATIONAL, Paris (FR)

( * ) Notice: Subject to any disclaimer, the term of this patent is extended or adjusted under 35 U.S.C. 154(b) by 19 days.

(21) Appl. No.: 16/643,818

(22) PCT Filed: Sep. 13, 2018

(86) PCT No.: PCT/EP2018/074720
§ 371 (c)(1),
(2) Date: Mar. 2, 2020

(87) PCT Pub. No.: WO2019/053114
PCT Pub. Date: Mar. 21, 2019

(65) Prior Publication Data
US 2020/0346958 A1    Nov. 5, 2020

(30) Foreign Application Priority Data
Sep. 14, 2017   (FR) ...................... 1758519

(51) Int. Cl.
*B01D 21/32*     (2006.01)
*B01D 21/24*     (2006.01)
(Continued)

(52) U.S. Cl.
CPC .......... *C02F 3/308* (2013.01); *B01D 21/2444* (2013.01); *B01D 21/32* (2013.01);
(Continued)

(58) Field of Classification Search
CPC ........ C02F 3/308; C02F 3/006; C02F 3/1263; C02F 3/301; C02F 2203/004;
(Continued)

(56) References Cited

U.S. PATENT DOCUMENTS

| 5,490,920 A * | 2/1996 | Fruchtbaum ........... B01D 21/20 210/112 |
| 2010/0149539 A1 | 6/2010 | Kwak et al. |
| 2010/0230347 A1* | 9/2010 | Haslem .............. B01D 17/0208 210/523 |

FOREIGN PATENT DOCUMENTS

| CN | 2541112 Y | 3/2003 |
| CN | 201634692 U | 11/2010 |

(Continued)

OTHER PUBLICATIONS

First Office Action issued in Chinese Patent Application No. 201880073741.9 dated Nov. 24, 2021, with English translation.
Yaquan, et al., "Experimental research of two-stage EGSB reactor treating actual coking wastewater", Journal of Environmental Engineering, vol. 8, No. 8, pp. 3294-3298, Aug. 31, 2014.

*Primary Examiner* — Claire A Norris
(74) *Attorney, Agent, or Firm* — BakerHostetler

(57) ABSTRACT

A reactor for the biological treatment of wastewater, includes a chamber capable of containing a mixture of wastewater and sludge comprising various levels, each level being defined by a sludge concentration and/or density; means for determining a minimum level and a maximum level of sludge extraction in the chamber, comprising: measurement means capable of measuring the sludge concentration and/or density at various levels of a mixture of wastewater and sludge; selection means capable of selecting a maximum sludge concentration and/or density value and a minimum sludge concentration and/or density value; deduction means capable of deducing a minimum extraction level corresponding to the maximum concentration value selected and a maximum extraction level corresponding to the minimum concentration value selected; extraction means capable of extracting sludge at variable levels between the minimum extraction level and the maximum extraction level.

11 Claims, 11 Drawing Sheets

(51) Int. Cl.
*C02F 3/30* (2023.01)
*C02F 3/00* (2023.01)
*C02F 3/12* (2023.01)

(52) U.S. Cl.
CPC ............ *C02F 3/006* (2013.01); *C02F 3/1263* (2013.01); *C02F 3/301* (2013.01); *C02F 2203/004* (2013.01); *C02F 2203/006* (2013.01)

(58) Field of Classification Search
CPC .. C02F 2203/006; B01D 21/32; Y02W 10/10; Y02W 10/37
USPC ........................................................ 210/96.1
See application file for complete search history.

(56) References Cited

FOREIGN PATENT DOCUMENTS

| | | |
|---|---|---|
| CN | 103848497 A | 6/2014 |
| CN | 205091155 U | 3/2016 |
| CN | 205333347 U | 6/2016 |
| JP | 5-184816 A | 7/1993 |
| JP | 10-323507 A | 12/1998 |
| JP | 2011-47760 A | 3/2011 |
| WO | 2004/024638 A1 | 3/2004 |
| WO | 2007/089141 A1 | 8/2007 |
| WO | 2009/050347 A1 | 4/2009 |
| WO | 2012/175489 A1 | 12/2012 |
| WO | 2016/004082 A1 | 1/2016 |

* cited by examiner

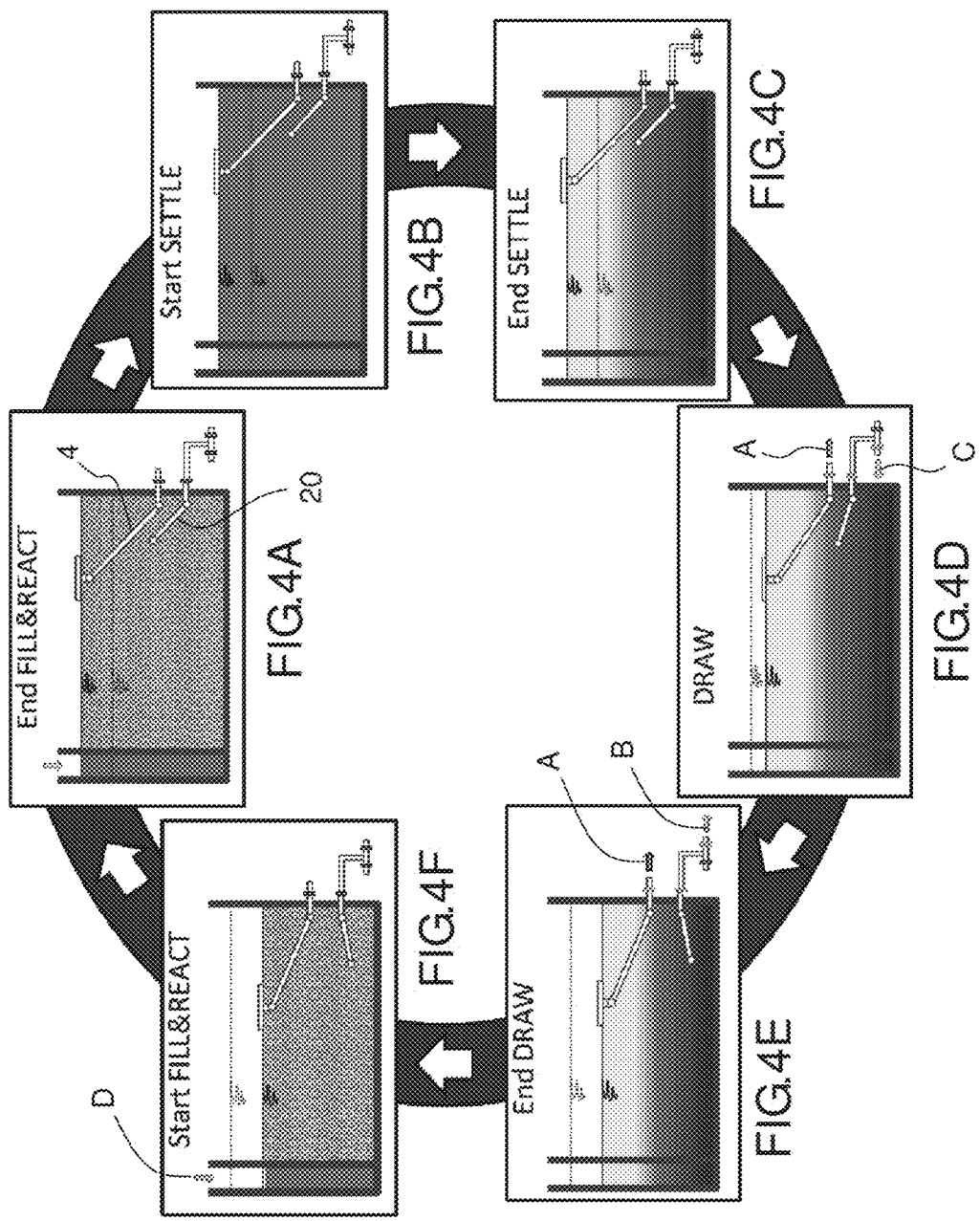

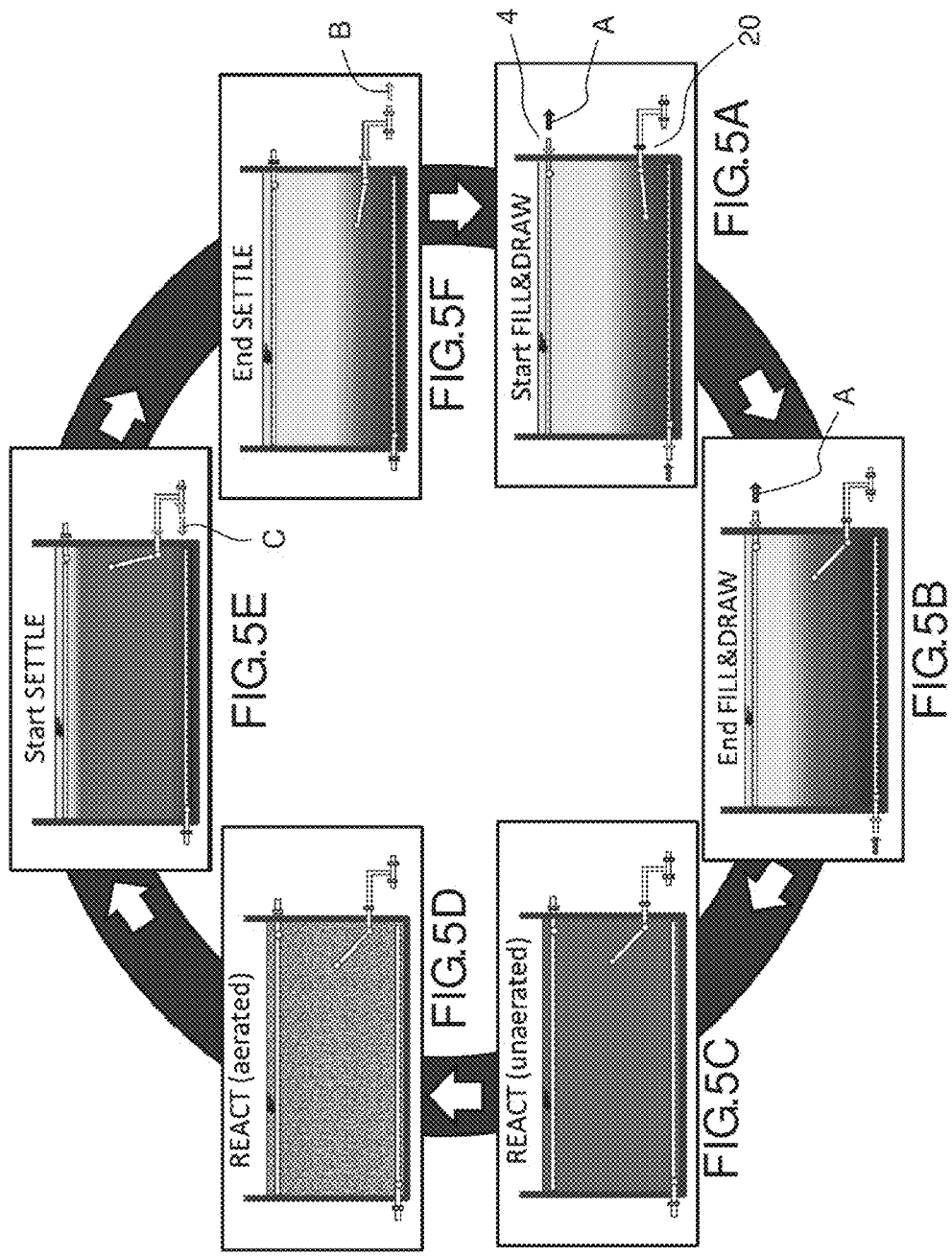

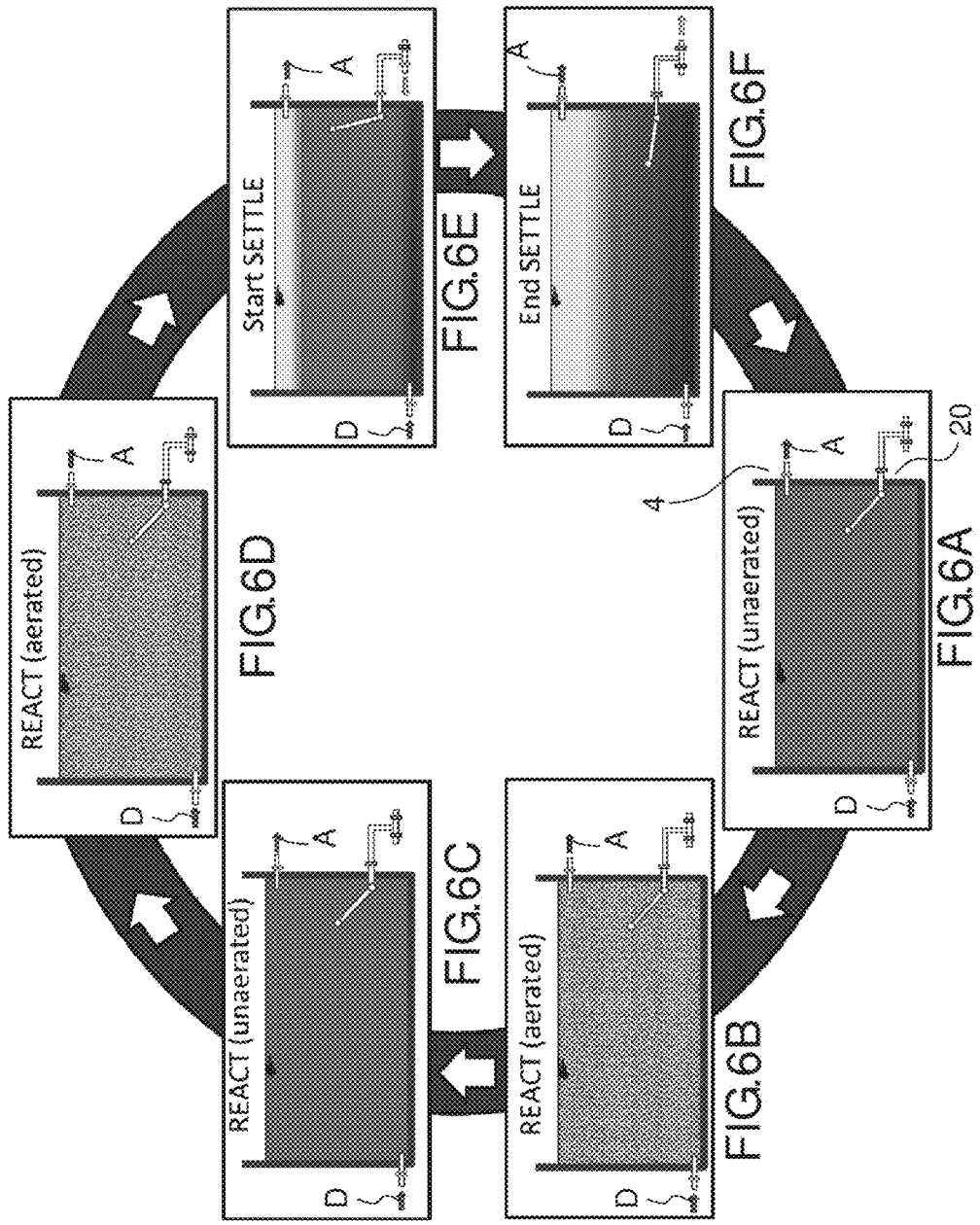

REACTOR AND METHOD FOR BIOLOGICAL TREATMENT OF WASTEWATER

CROSS-REFERENCE TO RELATED APPLICATIONS

This application is a National Stage of International patent application PCT/EP2018/074720, filed on Sep. 13, 2018, which claims priority to foreign French patent application No. FR 1758519, filed on Sep. 14, 2017, the disclosures of which are incorporated by reference in their entirety.

FIELD OF THE INVENTION

The present invention falls within the field of wastewater purification, more particularly within the field of the biological treatment of wastewater, that is to say a treatment using an activated sludge system.

The activated sludge process industrially reproduces the self-healing effect of rivers, according to the following simplified mechanism:

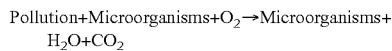

Activated sludge is sludge comprising microorganisms and it is therefore most often derived from the treatment of wastewater. It essentially consists of bacteria. The bacteria are mainly responsible for the removal of pollution from wastewater.

Activated sludge is most generally in the form of flocculated particles of various sizes having varied characteristics, and in certain applications it is in particular in the form of sludge granules (reference is also made to biomass particles and biomass granules).

In particular, the invention aims to improve the efficiency of said activated sludges by selection of the sludges according to their ability to separate out.

BACKGROUND

Activated sludge systems aim to remove the carbon-based pollution, nitrogen-based pollution and phosphorus-based pollution from wastewater.

Carbon-Based Pollution

The bacteria present in activated sludge will seek out, in the medium to be treated, typically the effluents to be treated, the substances essential to maintaining the rate of the activities thereof.

The bacterial culture contained in this sludge comprises autotrophic cells which are capable of converting water, carbon dioxide and mineral salts into their own substance by taking the required energy from the outside medium and by thus synthesizing stores that can be used at any time, constituting a potential accumulated energy, and heterotrophic cells which, on the contrary, are incapable of performing this synthesis and use nutritive substances that they oxidize to simpler materials. The energy thus released is used directly for the requirements of the cell. In this case, it involves degrading nutritive substances, also known as nutritive substrates, and using the energy thus released.

For removing the carbon from the effluents, the heterotrophic cells are used aerobically, since oxygen is associated with degradation reactions. The organic carbon is in the form of $CO_2$ and biomass.

In general, it is possible to schematically represent glucose degradation for example according to the following equation:

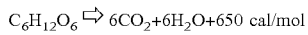

The main nutritive substrates of these bacteria are proteins, carbohydrates and lipids, but they can adapt to the consumption of other organic substrates, such as alcohols, phenols, aldehydes, hydrocarbons, etc.

A bacterial culture goes through various phases of growth and of decreased growth. The microorganisms adapt to the nutritive medium in a lag phase: the growth rate is then zero or weakly positive. When the rate of cell reproduction reaches its maximum in the presence of a nonlimiting concentration of substrate, this is referred to as exponential growth. This will be stopped by a decrease in the concentration of the nutritive substrate which decreases the growth rate, terminates it and even causes it to regress during a slowed phase. The absence of nutritive matter causes a decrease in the mass of the microorganisms.

A bacterial culture which is rich in heterotrophic cells and well oxygenated is therefore required to ensure removal of the carbon-based pollution. However, bacterial growth requires the presence of other nutritive elements, in particular the nitrogen and phosphorus contained in the effluents, and the removal of which is also required.

Nitrogen-Based Pollution

Wastewater also contains various nitrogen-based compounds: proteins, urea and decomposition products such as nitrogen in mineral form. The biological removal of these compounds takes place in two steps which are chronologically nitrification and denitrification.

Nitrification consists of the oxidation of the organic nitrogen in the form of ammonia ($NH^+_4$) to nitrite ($NO^-_2$), then to nitrate ($NO^-_3$) by means of autotrophic cells, according to the following equations:

The growth rate of autotrophic bacteria is slower than that of heterotrophic bacteria. The nitrification can also take place in the aerobic phase with heterotrophic bacteria according to the following equation:

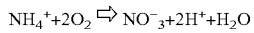

Denitrification is a process wherein the heterotrophic cells reduce nitric nitrogen to a lower oxidation state. It is carried out in the anaerobic/anoxic phase according to the following equation:

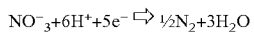

Phosphorus-Based Pollution

The removal of phosphorus is an activity that is also very important, in particular because of proliferation of algae that it generates at the surface of the water considerably, limiting exchanges with air and solar energy, and thus contributing to eutrophication of the water.

In point of fact, phosphorus is involved mainly in energy storage or release mechanisms, research on the possibility of carrying out biological dephosphatation has demonstrated that nonaerated activated sludge releases phosphorus and that, as soon as the oxygen concentration has gone back up, it reabsorbs the oxygen. There are some specific bacteria, termed PAOs (phosphorus-accumulating organisms), which are responsible for this phenomenon.

Biological dephosphatation exploits this complex phenomenon and uses PAO bacteria. The idea of biological dephosphatation is to provide the PAOs with the optimal conditions for promoting their growth compared to other organisms. Biological dephosphatation is thus based on the following observations:

PAOs are capable of storing phosphorus in the form of polyphosphates within their cells;

under anaerobic and/or anoxic conditions, PAOs assimilate fermentation products (acetate, or fatty acids for example stored in the form of intracellular macromolecules, such as polyhydroxybutyrate PHB) by using the energy of the stored polyphosphates, thus releasing inorganic phosphorus;

under aerobic conditions, the stored fermentation products are used for the production of energy and the growth of said bacteria. The energy used is also used to reconstitute the polyphosphate stock by reabsorbing the inorganic phosphorus drawn from the medium. The polyphosphate stock increases with the growth of the PAO bacteria.

The reabsorption of the inorganic phosphorus under aerobic conditions is greater than that which had been released under anaerobic/anoxic conditions. Thus, through a succession of anaerobic/anoxic conditions and of aerobic conditions, it is possible to obtain a gradual accumulation of phosphorus in the form of polyphosphates in these microorganisms up to values which can reach 10% of their dry weight.

This whole process results in the removal of about 50 to 65% of the phosphorus from the wastewater to be treated.

This alternating of anerobic/anoxic and aerobic conditions/phases is of value in all the other cases of removal of carbon-based pollution and nitrogen-based pollution, as seen above: it makes it possible to regulate the removal of the organic carbon required for all the steps of the treatment and also the proliferation of the microorganisms responsible for its removal; it provides the oxygen required for nitrification while at the same time subsequently enabling the denitrification in the anerobic and/or anoxic phase; it reinforces the accumulation of phosphorus in the microorganisms in the aerobic phase.

The biological treatment of water in a dedicated reactor must be carried out by subjecting the biomass to anerobic and/or anoxic and aerobic conditions, simultaneously making it possible to carry out dephosphatation, nitrification and denitrification.

The biological treatment of water can be carried out in a continuous-type reactor. In this case, the anerobic/anoxic and aerobic conditions are carried out by virtue of definite anerobic/anoxic and aerobic zones.

The biological treatment of water can alternatively be carried out in a batchwise or sequencing-mode reactor. The sequencing biological treatments of water consist in bringing the water to be treated into contact with the sludge which is housed in a reactor, and generally fluidized. This type of reactor is referred to as an SBR for Sequencing Batch Reactor. In this case, the anerobic/anoxic and aerobic conditions are not carried out by virtue of definite anerobic/anoxic and aerobic zones, but by virtue of successions of anerobic/anoxic phases and of aerobic phases.

The water treated, that is to say depleted of carbon-based, nitrogen-based and/or phosphorus-based pollution, must then be separated from the sludge in order to be recovered, and sometimes to undergo additional treatments, termed tertiary treatments.

Most often, the separation of the treated water and the sludge is carried out by settling of the sludge at the bottom of the reactor.

However, the sludge is in the water in the form of particles of different sizes, and in particular of small particles which settle poorly and generally have a diameter of less than one tenth of a millimeter. As a result of this, they settle slowly, which implies that the time required for the biological treatment of the water is relatively long.

In order to overcome this drawback, it is preferable to retain only a selection of sludge granules in the wastewater treatment reactor. The term "granular sludge" is also used. The sludge granules are particles defined as being a community of compact microbial species aggregated together, which have a size generally of between 0.1 and 5 mm and which have settling properties that are much faster than a conventionally activated sludge. Their density is generally between 1.02 and 1.10 kg/l.

The settling rate of the granular sludge in question is at least 10 m/h as opposed to approximately 1 m/h for flocculating sludge. Thus, the sludge granules, which are bulkier and heavier than other sludge particles, have a better settling capacity.

In point of fact, as mentioned in the introduction, the sludge is derived from wastewater that has already been treated and the microorganisms constituting it are derived from complex phenomena which are difficult to control, which generate flocculated particles of various sizes and which have varied characteristics of very different sizes, in particular in the form of filaments. Only specific conditions make it possible to obtain granules.

It is therefore necessary to be able to select particles that are more able to settle, and to remove the particles less able to settle: this is referred to as sludge particle selection.

The selection can be carried out either outside the reactor, or within the water treatment reactor.

In patent WO 2016/004082, the biological treatment is carried out in continuous mode with steps of continuous selection of the biomass particles (also called granules), either on the biomass stream exiting the reactor, or by sampling of the biomass in the aerobic zone of the reactor. One condition for efficient implementation of this process is that of having a definite anaerobic and/or anoxic zone within the reactor comprising an adequate degradable organic material in the form of acetate, or of fatty acid. Depending on the ratio between the fatty acids or the acetate available in the medium and the phosphorus to be extracted, the PAOs are capable of absorbing all the phosphate released in the anaerobic zone and of extracting additional phosphate present in the wastewater, thereby making it possible to clearly remove the phosphate by final extraction of the phosphate-charged biomass.

The granule selection systems are external to the reactor: they may be gravimetric selectors for separating the densest sludge aggregates (hydrocyclone, centrifuge, external gravity decanting device, etc.) or size selectors for separating the largest sludge aggregates (screen, filter, membrane device).

These systems aim to select the densest and/or largest granules, and to remove from the process the other sludge particles, for example filaments and the light flocks. These processes and systems require bulky and expensive devices, which cannot be used, or can be used only with difficulty, within the actual treatment reactor bringing the water to be treated in contact with the sludge granules or particles.

Patents CN103848497 (DHV) and WO 2004/024638 (TU Delft), describe processes, in particular a process marketed under the name NEREDA®, wherein the reactions take place in an SBR reactor. The actual volume of the sludge granule comprises an outer aerobic phase and an inner anaerobic phase. Thus, patent application WO 2004/024638 discloses an SBR sequencing batch reactor wherein a bed of biomass granules is housed. In a first step, the wastewater to be treated is introduced via the bottom of the reactor under anerobic conditions. The water feed flow rate of the reactor is chosen in such a way that the feed is slower. The formation of a fluidized bed of biomass granules is thus avoided. When the feeding of the reactor with water to be treated is complete, a non-stirred lag phase is observed in the reactor, during which the water to be treated is left in contact with the biomass granules. During this phase, the nutritive substrates present in the water are assimilated by the biomass, the granules of which experience a resulting increase in their volume and their density, promoting in particular the development of PAOs (phosphorus-accumulating organisms).

A second step consists of aerating the reactor by means of a ramp provided in the lower part of the reactor. The nitrogen-based pollution contained in the water to be treated is then at least partly degraded by nitrification-denitrification. The PAO development and the phosphate extraction are also permitted. During a third step, the granules are extracted, then settling is carried out within the reactor before extracting therefrom treated water depleted of nitrogen-based pollution. The technique described in this document makes it possible to reduce the nitrogen-based pollution concentration, but also phosphorus-based pollution, in the water.

A step of selection between the granules according to their ability to settle is mentioned, but it is not specified how this is carried out.

Patent application WO 2012/175489 from Veolia describes a process similar to that of the TU Delft patent, with an SBR reactor, which further comprises an anerobic step of stirring and forming a fluidized bed of biomass granules. A process of extracting the granules that have not settled very much or the fine particles is carried out after several cycles. The extraction is carried out by a fixed system which is also used for collecting the treated water and which allows an extraction from the surface of the treated water. Such a system performs an extraction of the sludge granules which settle poorly by leaching in the upper part of the reactor. The problem is that the circuit for recovering the treated water and that of the extraction comprise a common portion. Thus, the treated water can contain sludge, in particular sludge particles of small diameters, which causes a low quality of the treated water and imposes subsequent expensive and lengthy treatments (for example filtration, flotation, clarification which can also require the addition of chemical products such as coagulants and flocculating agents).

Patent application WO 2009/050347 by Degremont describes an SBR reactor configured in two compartments, the first comprising a bed of sludge particles and the second comprising the water to be treated, which is discharged to the first compartment under hydraulic stress (generated by sequences of reduced pressure/return to atmospheric pressure). This induces a movement on the particle bed, which is thus pulsed and expanded. A concentration zone comprising a closing device and located in the second compartment makes it possible to recover the nonagglomerated sludge by means of the opening of the closing device carried out during the resuspending of the non-settled sludge. This corresponds to the phase of admission of the water into the second compartment. This recovery zone is fixed, and is located at the bottom of the compartment. In this patent application, the selection and the extraction of the sludge particles that settle poorly are carried out by recovery in the lower part of the compartment of the reactor, and especially at a fixed level thereof. This has the drawback either of extracting sludge particles of good settling capacity, or of not extracting all the sludge of poor settling capacity, generating an extraction of a mixture of varied sludge qualities, with the need to have subsequent steps of selection between the sludge particles according to their ability to settle. In order to limit this drawback, it will be necessary to carry out numerous, long treatment/recovery cycles, without the certainty of extracting only the poor sludge.

Patent application WO 2007/089141 discloses a process for purifying wastewater, implicitly using an SBR reactor, and wherein the wastewater is introduced via the bottom of the reactor so as to be brought into contact with sludge particles containing microorganisms, then an oxygen-containing gas is injected under the sludge particles, and, finally, the sludge particles settle. The particles which have a poor settling capacity are extracted from the reactor via a withdrawal point located at a fixed height of the reactor, for example between 50 and 98% of the height of the reactor.

The extraction system mentioned in the patent application above is difficult to adapt to the variation in operating conditions of the treatment systems (loads, flows, solids concentration, temperature). This drawback is found in all the cited applications. It is thus difficult to control good particle separation in order to obtain particles having a desired ability to settle.

Thus, the main objective of the invention is to be able to select and extract sludge particles according to their ability to settle within a water treatment reactor, more specifically, without the cited drawbacks of the prior art systems.

SUMMARY OF THE INVENTION

To this effect, a subject of the invention is a reactor for the biological treatment of wastewater, comprising:
- a chamber capable of containing a mixture of wastewater and sludge comprising various levels, each level being defined by a sludge concentration and/or density;
- means for determining a minimum level and a maximum level of sludge extraction in the chamber, comprising:
    - measurement means capable of measuring the sludge concentration and/or density at various levels of a mixture of wastewater and sludge;
    - selection means capable of selecting a maximum sludge concentration and/or density value and a minimum sludge concentration and/or density value;
    - deduction means capable of deducing a minimum extraction level corresponding to the maximum extraction value selected and a maximum extraction level corresponding to the minimum concentration value selected;
- extraction means capable of extracting sludge at variable levels between the minimum extraction level and the maximum extraction level.

Thus, the invention consists of a reactor for the biological treatment of wastewater, comprising a selective sludge extraction device.

The selection of the sludge to be extracted is carried out by the means for determining extraction levels as a function of characteristics of the sludge present at these levels. Some of these determination means are described below. The principle of the selection is based on the determination of a minimum level and a maximum level of sludge extraction, these levels being determined by measuring the concentration and/or the density of the sludge to be extracted. This thus makes it possible to carry out a selective extraction according to the settling ability of the sludge, in a more precise and more targeted manner than the prior art devices, said settling ability of the sludge being linked to the sludge concentration and/or density.

The extraction is carried out by extraction means, some of which are described below, and which make it possible to carry out an extraction of the sludge between a minimum extraction level and a maximum extraction level.

The sludge extraction means have means capable of varying the level of extraction of said sludge.

The means for determining the minimum and maximum extraction levels are combined with the extraction means, thereby making it possible to carry out a selective extraction actually within the reactor, that is to say without having to add bulky, expensive devices, most of which cannot be used actually within the treatment reactor and thus require additional circuits and/or chambers.

Thus, the device according to the invention makes it possible to more safely and more precisely extract sludge which has a weak settling ability, and to retain sludge which has a better settling ability.

One of the advantages of the invention is therefore that of having means for extracting sludge which has a weak settling ability, which make it possible to carry out the extraction of said sludge within the treatment reactor, said extraction being sufficiently precise to avoid having to carry out a subsequent step, outside the reactor, of separation of the treated water and the sludge, and/or a subsequent step, outside the reactor, of selection between the various sludge particles.

Thus, another advantage of the invention is that of retaining in the reactor only dense sludge particles (or granules). Indeed, some of these granules have a better substrate-concentration and electron-accepter gradient between the center (anerobic) and the periphery (aerobic/anoxic) of the granule; this gradient makes it possible to grow the anerobic center so that more organisms, such as PAOs, can be housed therein. This thus makes it possible for processes such as the biological removal of phosphorus to be carried out efficiently without the need for selective aerobic, anerobic and/or anoxic zones or for aerobic, anerobic and/or anoxic time sequences.

Another advantage of the invention is that of improving the performance result of the treatment and the proportioning of the tertiary treatment processes (filtration, clarification, etc.) which sometimes follow the biological water treatment step and which depend greatly on this capacity of the sludge to settle and on the associated settling rate.

Another advantage is, because the sludge particles having a weak settling ability are extracted from the reactor, that of being able to design reactors of smaller volume.

Finally, another advantage is that of enabling the extraction of matter floating in the water (froth, fat, floating sludge, foams, etc.) so as to prevent the accumulation thereof and the inherent problems. For example, the extractor can be placed in such a way that the extraction takes place just below the free level or on the free level of the water in the reactor.

According to one advantageous embodiment, the biological treatment reactor further comprises recycling means capable of recycling the extracted sludge into the chamber. This makes it possible to improve the selection, by repeating the selective extraction process several times.

Sludge Extraction Means

According to one embodiment, the extraction means comprise:

an extractor comprising at least a first portion having at least one opening inside the chamber and a second portion capable of causing the sludge to exit the chamber;

variation means capable of varying the position of the opening of said extractor, in particular the level of the opening between the minimum extraction level and the maximum extraction level.

The term "opening" should be understood to mean "at least one opening" for all of the present description.

According to one embodiment, the second portion of the extractor further comprises a sealed passage at the level of one of the walls of the chamber, so as to cause the sludge to exit the reactor chamber.

According to one embodiment, the extractor comprises a pump and the variation means comprise means for varying the level of the pump in the chamber. The opening of the first portion of the extractor corresponds to the inlet of the pump, in other words the intake of the pump. The second portion of the extractor is connected to the outlet of the pump, in other words the delivery of the pump, which makes it possible to recover the sludge outside the chamber.

Such a system is simple to implement and makes it possible to vary the extraction level continuously.

Alternatively, the extraction may comprise a pump or any other means placed outside the chamber and capable of causing the sludge to exit the reactor chamber.

In relation to the previous solution, the pump is located outside the chamber. Thus, the pump does not take up any space in the chamber. For example, it does not disrupt the reactions which take place in the reactor. It is also an advantage in terms of pump cleaning and maintenance, since said pump is not in direct contact with the water to be treated and the sludge.

According to one embodiment, the extractor comprises a tube of which a first end has an opening inside the chamber, and of which a second end is connected to the second portion of the extractor, and the variation means comprise means for moving said tube on either side of its second end so as to modify the position of the first end of said tube.

Such a system is very simple to implement.

According to one embodiment, the extractor comprises a flexible hose of which a first end has an opening inside the chamber, and of which a second end is connected to the second portion of the extractor, and the variation means comprise means for moving the first end of said flexible hose.

Such a system is simple to implement, and has good adaptability since it is not only the height of the opening that is variable, but it is also the distance between the first end and the wall of the chamber that can be adapted. For example, it is possible to recover the sludge at the level of the wall of the chamber, in particular at the level of the wall where the extraction means are attached.

According to one particular embodiment, the means for moving the first end of the flexible hose comprise a component connected to said first end of said flexible hose, said component being capable of cooperating with a screw such that, when the screw is actuated, said component is driven in a vertical movement along said screw.

This makes it possible to easily, rapidly and for example remotely control the first end of the pipe.

The component may be a plate or a disk. It can slide inside a cylinder for example.

According to another embodiment, the extractor comprises a reservoir connected to the second portion of the extractor and having a slot inside the chamber, and comprise a door which has an opening facing said slot, the reservoir and the door being assembled in such a way that no fluid can circulate between them, and the variation means comprise means for moving the door in a substantially vertical movement.

In this case, the variation means thus comprise means for moving the door. The door can be moved easily, rapidly and remotely. This requires, for example, a vertical translational movement of the door, and either a considerable vertical displacement above the reactor, or the addition of mechanical means suitable for converting a horizontal or rotary movement into said vertical translational movement.

According to another embodiment, the extractor comprises a first cylindrical tube which has a substantially rectilinear slot inside the chamber, and a second cylindrical tube which has a substantially helicoidal slot inside the chamber, one of the cylindrical tubes being positioned inside the other and being connected to the second portion of the extractor, the first and second tubes being assembled in such a way that no fluid can circulate between them, and the variation means comprise means for turning one of the tubes relative to the other.

These variation means make it possible to easily, rapidly and remotely control the opening between the two cylindrical tubes which corresponds to the intersection between the two slots. This also corresponds to the opening of the first portion of the extractor. The variation means must perform a rotary movement of one of the tubes and thus do not require a vertical displacement above the reactor. Finally, it can make it possible to perform a fine rotation and therefore a fine variation of the extraction level.

The assembly of the extraction means described above makes it possible to vary the extraction level continuously.

According to another embodiment, the extractor comprises a set of tubes placed at various levels in the chamber, each tube comprising a first end which has an opening inside the chamber and a second end connected to the second portion of the extractor, and the variation means comprise a set of valves capable of opening or closing said tubes. In this system, it is not necessary to apply movements and/or displacements to all or part of said reactor. It is sufficient to control the opening of one or more valves. These extraction means make it possible to vary the extraction level discretely and noncontinuously.

The extraction means presented are quite diverse and they are all quite easily integratable into an existing reactor. The advantage is that they can be chosen according to the reactor, to the chamber thereof and/or to the environment.

Means for Determining the Extraction Levels

According to one embodiment, the measurement means comprise emission means capable of emitting a signal in a mixture of wastewater and sludge and reception means capable of receiving, from the emitted signal, a signal having travelled a given distance in the mixture of wastewater and sludge. The technique of emission/reception of a signal is a nonintrusive technique, which is easy to implement, which delivers information virtually immediately and which avoids carrying out sampling.

According to one particular embodiment, the signal is a wave, the emission means and/or the reception means comprising a sensor capable of being immersed below the surface of a mixture of wastewater and sludge and capable of emitting a wave and/or of receiving a wave. A single sensor can act as an emitter and a receiver.

According to one particular embodiment, the wave is an ultrasonic wave. The ultrasonic technique makes it possible to provide precise and rapid information, which makes it particularly suitable for the invention. In addition, it is not necessary to vary the level of immersion of the ultrasonic probe.

According to another particular embodiment, the signal being radiation, the emission means comprise a radiation source and the reception means comprise a radiation detector, said detector being configured so as to receive, from the emitted radiation, radiation having travelled a given distance in a mixture of wastewater and sludge.

According to one particular embodiment, the biological treatment reactor further comprises an immersion duct.

According to one embodiment, the radiation source (respectively the radiation detector) is placed in the immersion duct, and the radiation detector (respectively the radiation source) is placed at the level of an exterior wall of the chamber.

According to another particular embodiment, the radiation source and the radiation detector are placed at the level of an exterior wall of the chamber. In this case, backscattering of the signal is used, thereby avoiding having to insert an immersion duct into the chamber. In addition, to carry out measurements at various levels, it is sufficient to move the sole sensor acting as emitter/receiver.

According to one particular embodiment, the radiation is gamma radiation.

According to one embodiment, the measurement means comprise a probe and immersion means capable of immersing the probe at various levels in a mixture of wastewater and sludge in such a way as to measure the concentration of the sludge at said various levels in said mixture of wastewater and sludge. This makes it possible to measure a concentration at various levels and therefore to link a concentration with a level.

According to one particular embodiment, the probe measuring the sludge concentration comprises an optical absorptiometer.

A subject of the invention is also a process for the biological treatment of wastewater in a reactor according to the invention and comprising the following steps:
    determining a minimum level of extraction and a maximum level of extraction of the sludge in the chamber;
    extracting the sludge between the minimum extraction level and the maximum extraction level.

According to one preferential embodiment, the process comprises a sludge settling step.

According to one embodiment, the process comprises a step of introducing wastewater into the chamber.

According to one embodiment, the process comprises a step of biological treatment of wastewater by reaction with the activated sludge.

According to one embodiment, the process further comprises a step of withdrawing treated water at a level above the maximum sludge extraction level.

According to one embodiment, the step of withdrawing treated water is carried out after the step of introducing the wastewater into the chamber and after the sludge settling step. This mode is suitable for a variable-level reactor.

According to one embodiment, the step of withdrawing treated water is carried out simultaneously with the step of introducing wastewater into the chamber and after the sludge settling step. This mode is suitable for a fixed-level reactor.

According to one embodiment, the process comprises a step of recycling the extracted sludge into the biological reactor. This makes it possible to improve the precision of the selection, by repeating the selective extraction process several times.

According to one particular embodiment, the reactor is a sequencing reactor and all the steps are repeated at least once. This also makes it possible to improve the precision of the selection.

BRIEF DESCRIPTION OF THE DRAWINGS

The invention will now be understood more clearly and other advantages will emerge on reading the detailed description of several embodiments given by way of example, said description being illustrated by the appended figures among which:

FIGS. 4A to 4F illustrate a process according to one embodiment of the invention applied to a variable-bed SBR reactor;

FIGS. 5A to 5F illustrate a process according to another embodiment of the invention applied to a fixed-bed SBR reactor;

FIGS. 6A to 6F illustrate a process according to one embodiment of the invention applied to a continuous reactor;

DETAILED DESCRIPTION

Figure 1:
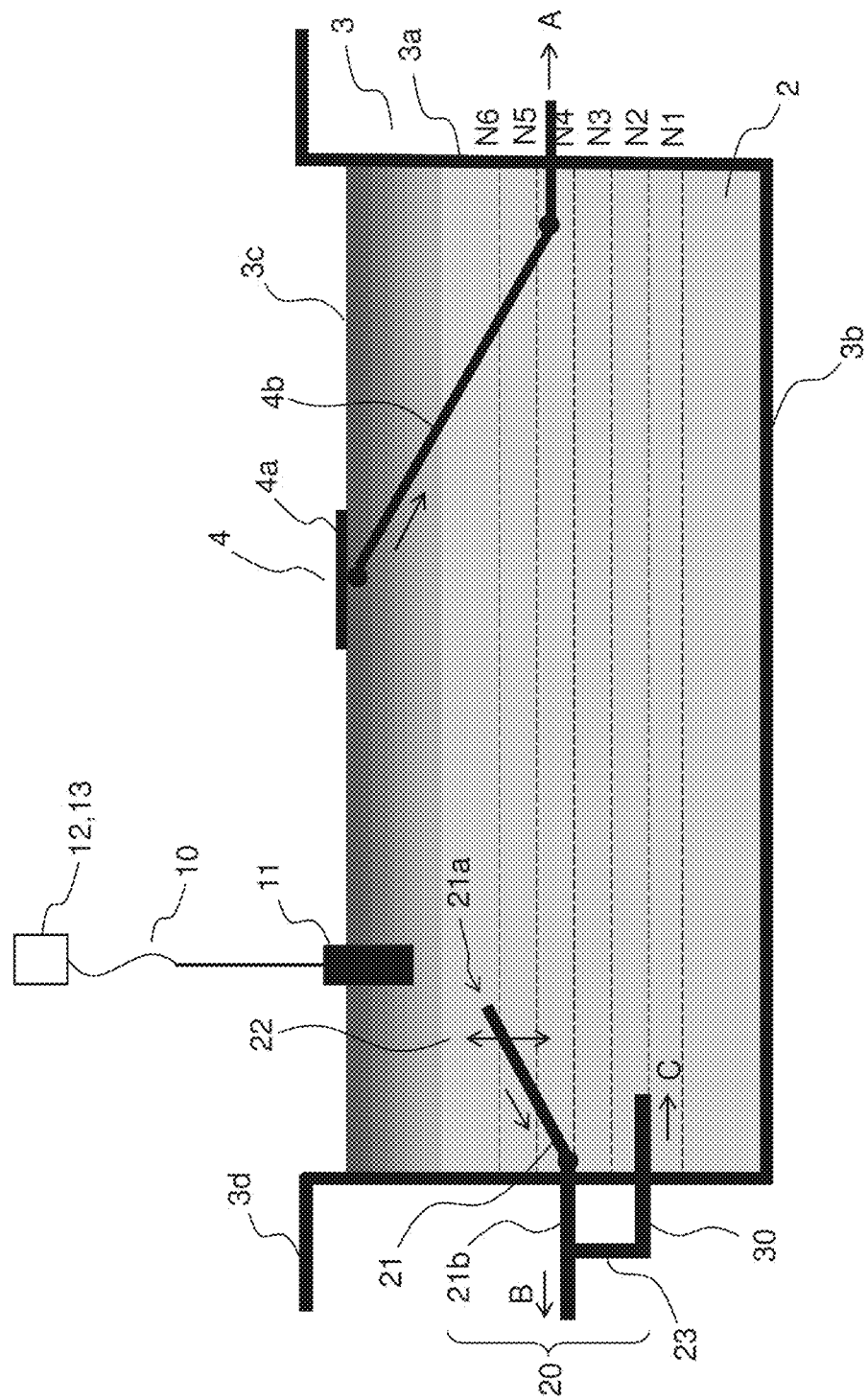
FIG. 1 illustrates an example of a reactor according to the invention.

FIG. 1 illustrates an example of a reactor 1 according to the invention. The reactor 1 comprises a chamber 3. The chamber 3 comprises one or more vertical walls 3a, a bottom wall 3b, an opening 3c in the upper portion and optionally rims 3d.

During the wastewater treatment, the chamber 3 is filled with a mixture 2 of wastewater and sludge. When the sludge has settled, the water is in the upper portion of the reactor chamber. The water can be drawn off via the opening 3c of the chamber by means of a withdrawal system 4 capable of withdrawing the water and comprising a floating portion 4a such that the withdrawal system follows the free surface of the water, and an immersed pipe 4b connected to the floating portion via which the water can be suctioned and withdrawn out of the chamber (arrow A).

The heaviest and/or densest sludge particles are at the bottom and they can be drawn off at the level of the bottom wall 3b of the chamber. Between the two, there is the remainder of the mixture, which is in the form of a stratification, that is to say which has several levels $N_1$, $N_2$, $N_3$, $N_4$, $N_5$, $N_6$, etc., each level being defined by a sludge concentration and/or density in the mixture 2.

The reactor 1 according to the invention makes it possible to selectively extract the sludge least capable of settling that is in the mixture 2. For that, the reactor comprises means 10 for determining a minimum level and a maximum level of extraction of the sludge in the chamber comprising measurement means 11, for example a measurement probe. Said measurement probe makes it possible to measure the sludge concentration and/or density in the mixture. The measurement probe 11 can be immersed in the mixture as illustrated or nonimmersed. It can be at a fixed or variable immersion depth depending on the type of probe chosen.

The measurement probe 11 is connected to selection means 12, which make it possible to verify whether or not the measurement corresponds to sludge to be extracted, and deduction means 13 which make it possible to link the measurement to the corresponding level. These determination means 10 are connected to sludge extraction means 20, more particularly to the means for variation 22 of the extraction level, mainly for selecting the extraction level. The variation means 22 vary the level of the opening 21a of the extractor 21.

The reactor 1 according to the invention thus comprises means for extraction 20 of the sludge, the extraction level of which can be varied.

The extracted sludge can be either discharged (arrow B), or recycled into the reactor 1 (arrow C).

The reactor 1 can comprise means for recycling 30 the extracted sludge into the chamber 3.

The extraction means 20 can comprise means 23, which make it possible to send the extracted sludge either to discharge, or to recycling into the reactor 1.

FIGS. 2A to 2G illustrate several reactors 1 according to several embodiments of the invention comprising an ultrasonic probe and various extraction means.

In all the following figures, the extractor 21 is partly introduced into the chamber 3, and partly immersed in the mixture 2 of wastewater and sludge.

In the embodiments of FIGS. 2A to 2G (not entirely represented for 2F), the extractor 21 comprises a second portion 21b which is in this case merged with an outlet circuit 21b, said outlet circuit being capable of causing the sludge to exit the chamber 3.

The outlet circuit 21b can comprise at least one fixed tube which sealably passes through a wall of the chamber 3.

It may be any other means for passing through the wall. The wall may be the vertical wall or the bottom wall.

More broadly, the outlet circuit 21b may comprise a hose and/or a tube or any means capable of passing the sludge out of the chamber 3. These may be means which do not require having to pass through a vertical wall or the bottom wall of said chamber, for example using the opening 3c of the chamber.

In addition, the extraction means 20 may comprise a three-way system 23 comprising a tube 23a fitted with two valves 23b and 23c (or one three-way valve) so as to direct the extracted sludge either to discharge B from the reactor, or to recycling C of the sludge into the reactor. The three-way system 23 is connected to the outlet circuit 21b.

In addition, the outlet circuit 21b can comprise a valve 21c. For example, the valve can make it possible to manage the opening or closing between the outlet circuit 21b and the three-way system 23.

Figure 2A:
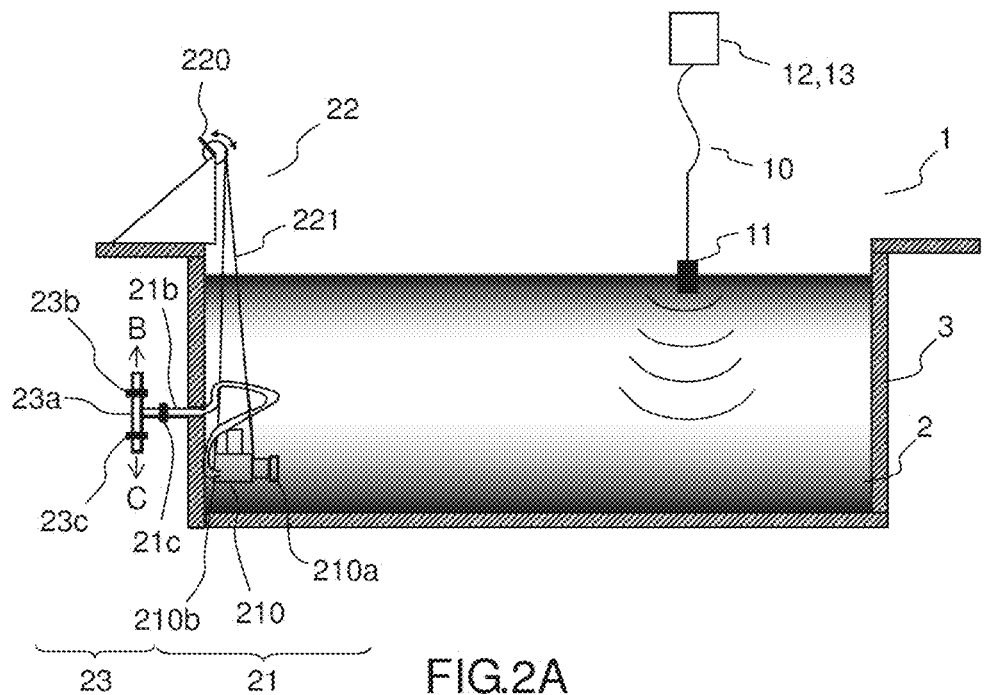
FIGS. 2A to 2G illustrate several reactors according to several embodiments of the invention, comprising an ultrasonic probe and various extraction means.

In the embodiment illustrated in FIG. 2A, the extractor 21 comprises a pump 210 which is introduced into the chamber 3 and immersed in the mixture 2, and variation means 22 capable of varying the level of the pump 210 in the chamber. It may for example be a winch 220 which makes it possible to control the winding and unwinding of a cable, of a chain or of any other type of line 221 connected to the pump.

The sludge extraction level corresponds to the level of the pump in the chamber and more particularly to the level of the opening 210a (the intake) of the pump in the chamber.

The outlet 210b (the delivery) of the pump is connected to the outlet circuit 21b in such a way as to cause the pumped sludge to exit the chamber 3.

According to FIG. 2A, the outlet circuit 21b comprises a flexible-hose portion and a fixed-tube portion which passes through a wall of the chamber 3.

In the embodiments illustrated in FIGS. 2B to 2G, the extraction means 20 can comprise a pump or any other means for causing the sludge to exit the chamber 3.

Figure 2B:
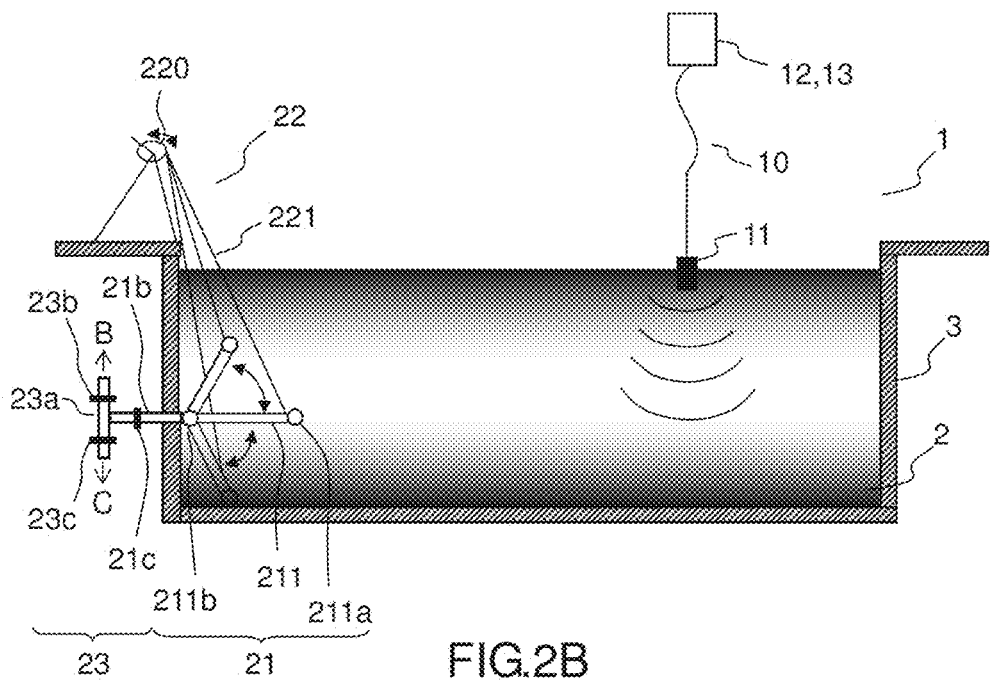

In the embodiment illustrated in FIG. 2B, the extractor 21 comprises a tube 211 of which a first end 211a has an opening in the chamber 3 and a second end 211b is connected to the outlet circuit 21b. The tube 211 is rigid and it can move about its second end 211b which forms an articulation. The control means 22 comprise for example a winch 220 which makes it possible to control the winding and unwinding of a cable, or of a chain or of any other type of line 221 connected to the first end 211a of said tube. In this way, the level of the first end 211a, consequently the level of the opening of said tube and, finally, the sludge extraction level, are varied.

Figure 2C:
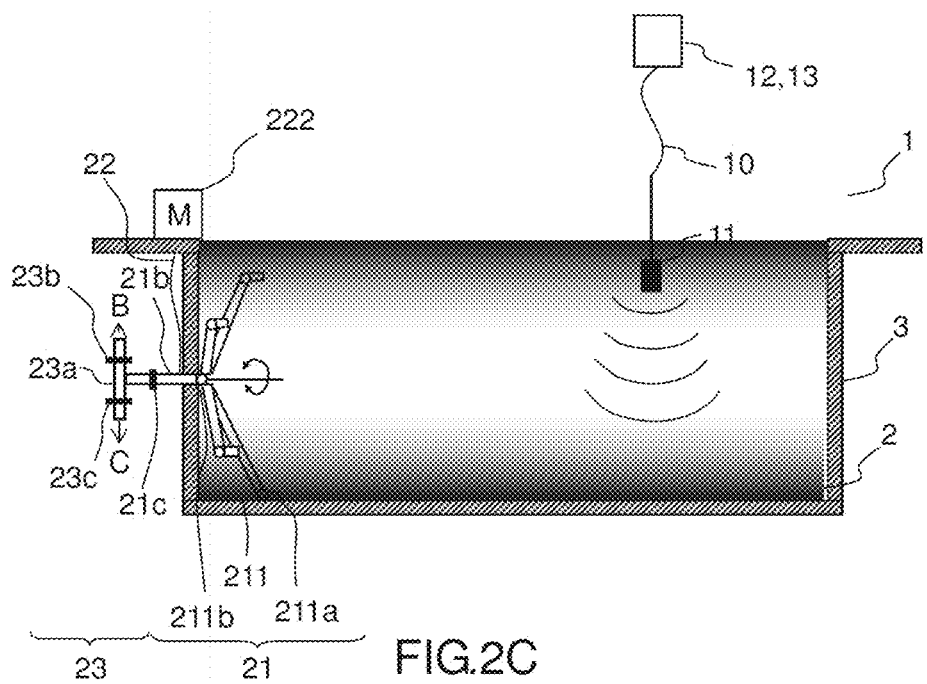

The embodiment illustrated in FIG. 2C differs from that of FIG. 2B in that the tube 211 can have a variable length, for example it may be telescopic, and in that the control means 22 comprise a motor 222 which operates in rotation and is capable of causing the tube 211 to turn about its second end 211b. In this way, the level of the first end 211a, consequently the level of the opening of said tube and finally the sludge extraction level, are varied.

Figure 2D:
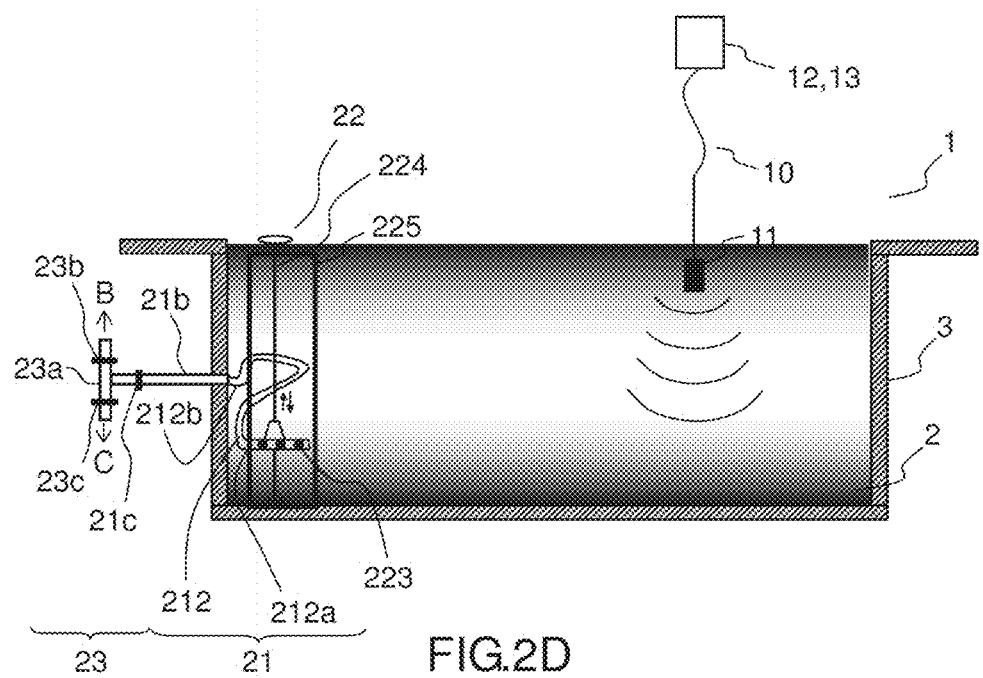

In the embodiment illustrated in FIG. 2D, the extractor 21 comprises a flexible hose 212 of which a first end 212a has an opening in the chamber 3 and a second end 212b is connected to the outlet circuit 21b. The first end 212a is connected to a component 223, said component cooperating with a screw 224, for example a worm screw. Thus, when the screw 224 is actuated, the component 223 is driven in a vertical movement along said screw. In this way, the level of the first end 212a, consequently the level of the opening of said hose and finally the sludge extraction level are varied.

The component 223 may be a disk or a plate. In the example represented, it slides inside a cylinder 225. The screw 224 can be actuated manually or by means of a motor operating for example in rotation (not represented).

Figure 2E:
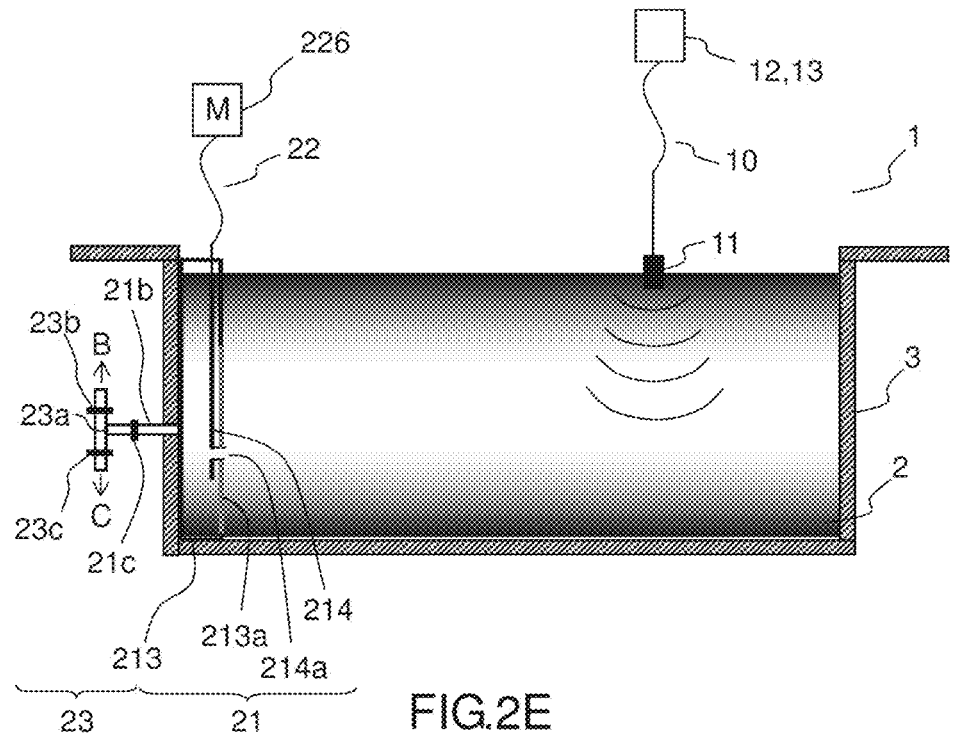

In the embodiment illustrated in FIG. 2E, the extractor 21 comprises a reservoir 213 connected to the outlet circuit 21b and of which a wall has a slot 213a, and a door 214 which has an opening 214a placed facing the rectilinear slot 213a. The door 214 sealably slides along the interior wall (or alternatively along the exterior wall) of the reservoir which has said slot; this is because no sludge and no liquid must circulate between the door 214 and the interior wall of the reservoir 213. The variation means 22 comprise a motor 226 which operates in translation mode, and which is connected to the door 214 so as to subject said door to a substantially vertical movement. In this way, the level of the opening 214a of the door, which is located opposite the slot 213a of the reservoir, is varied, and consequently the sludge extraction level is varied in the reservoir 213, then outside the chamber 3 via the outlet circuit 21a.

Figure 2G:
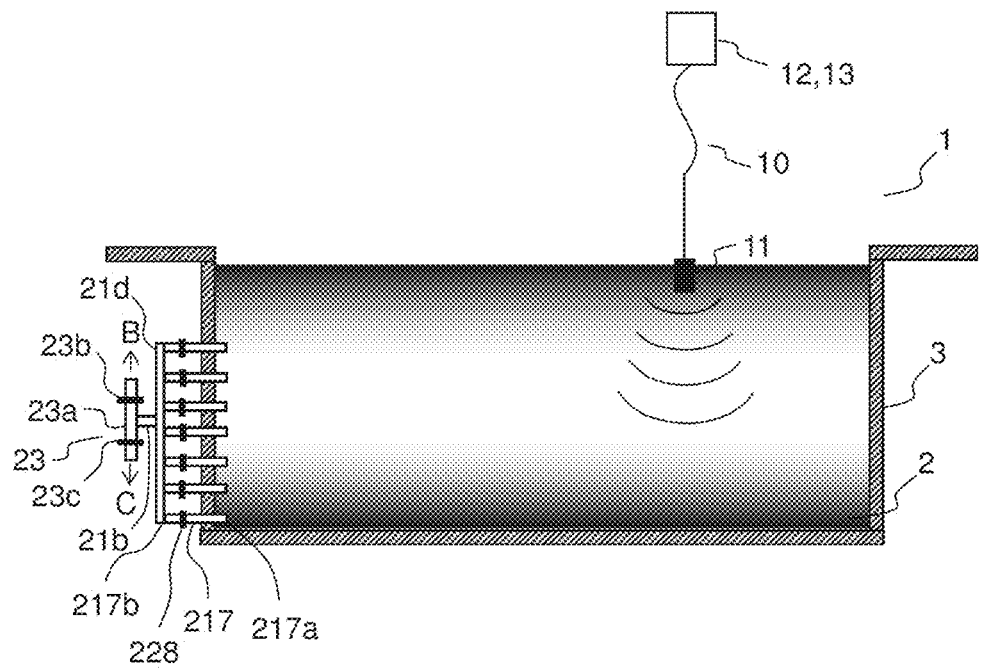
Figure 2F:
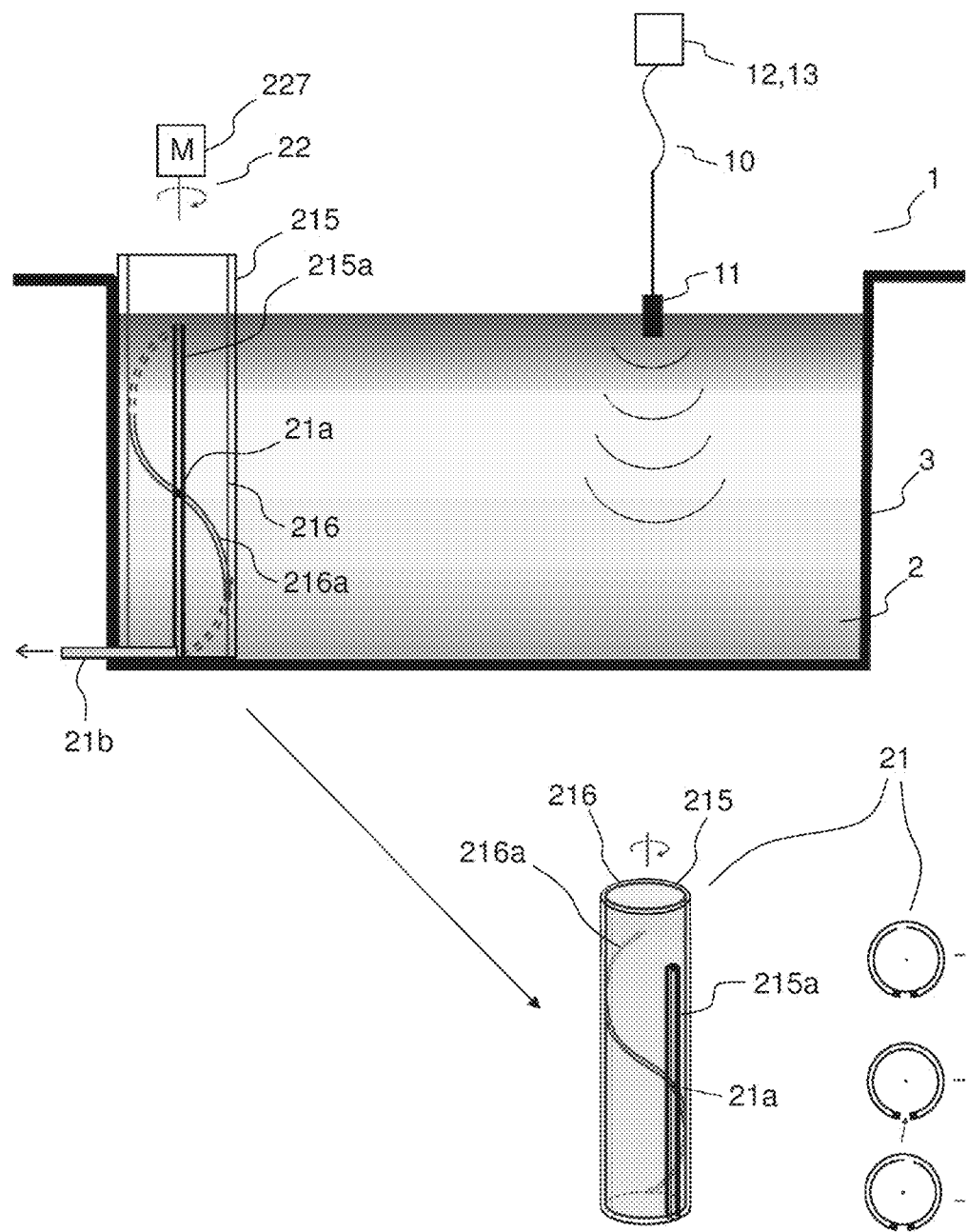

In the embodiment illustrated in FIG. 2F, the extractor 21 comprises a first cylindrical tube 215 which has a rectilinear slot 215a and a second cylindrical tube 216 which has a substantially helicoidal slot 216a, one of the cylindrical tubes being positioned inside the other, the first and second tubes being assembled in such a way that no fluid can circulate between the two tubes, the interior tube being connected to the outlet circuit 21b. The variation means 22 comprise a motor 227 capable of causing one of the tubes to turn relative to the other. The passage of the sludge takes place at the level of the intersection of the rectilinear slot 215a and the helicoidal slot 216a. In this way, the level of the opening 21a corresponding to said intersection is varied, and consequently the sludge extraction level is varied in the interior tube and then outside the chamber 3 via the outlet circuit 21b.

In the mode illustrated in FIG. 2G, the extraction means comprise a set of tubes 217 which are placed at various levels in the chamber 3 and which pass through at least one vertical wall of said chamber. Each tube has a first end 217a open in the chamber 3 and a second end 217b connected to a collector 21d. The collector 21d is connected to the outlet circuit 21b. The control means 22 comprise a set of valves 228 capable of opening or closing said tubes.

In this figure, the collector 21d and the valves 228 are located outside the chamber, which requires having several through-passes into the chamber.

Advantageously, the collector 21d can be placed in the chamber 3, which avoids having several through-passes into the chamber (with the associated risks of leaking).

One or more valves 228 can be placed in the chamber 3.

Alternatively, the link between the tubes 217 and the collector 21d can pass via the upper opening of the chamber 3 without having to pass through a vertical wall or the bottom wall of said chamber.

In the embodiments illustrated in FIGS. 2B to 2G, it is sometimes necessary to provide a pump or any other means for drawing or suctioning the sludge out of the reactor.

In the embodiments illustrated in FIGS. 2A to 2G, the measurement means 11 of the determination means 10 comprise an ultrasonic sensor immersed below the surface of a mixture of wastewater and sludge. The ultrasonic sensor makes it possible to send an ultrasonic wave into said mixture (it then operates as an emitter), then to receive a returning ultrasonic wave after it has travelled a given distance in the mixture of wastewater and sludge (it then operates as a receptor). The sensor is connected to the selection means 12 and to the deduction means 13.

Figure 3A:
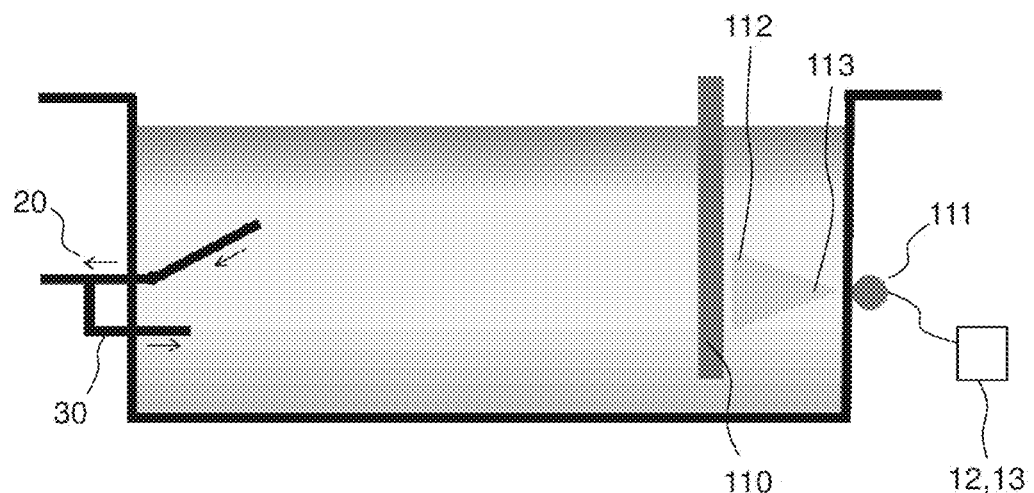
FIGS. 3A and 3B illustrate two reactors comprising systems comprising a gamma radiation source and a gamma radiation detector placed according to two different embodiments.
Figure 3B:
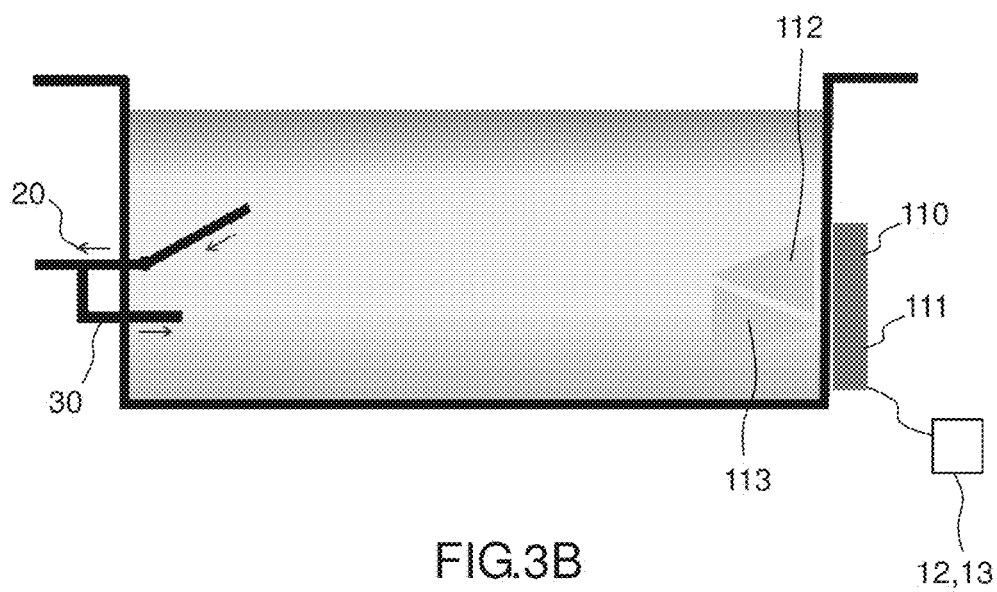

FIGS. 3A and 3B illustrate a reactor according to other embodiments of the invention comprising other measurement means 11. Represented moreover very schematically are the extraction means 20 which can be one of the means previously illustrated, and also the recycling means 30.

In the embodiments illustrated in FIGS. 3A and 3B, the measurement means 11 capable of measuring the sludge concentration and/or density comprise a system comprising a gamma radiation source 110 and a gamma radiation detector 111, otherwise referred to as a gammametry system. The gamma radiation detector 111 is configured so as to receive, from the emitted gamma radiation 112, a gamma radiation 113 having travelled a given distance in the mixture 2 of wastewater and sludge.

In the embodiment illustrated in FIG. 3A, the reactor 1 comprises an immersion duct 5 partly introduced into the chamber 3, and, in the example represented, immersed in the mixture 2. A radiation source 110 is placed in said immersion duct. The radiation detector 111 is placed against a wall outside the chamber 3, for example a vertical wall. The detector 111 is connected to the selection means 12 and to the deduction means 13.

In the embodiment illustrated in FIG. 3B, the radiation source 110 and the radiation detector 111 are placed against a wall on the outside of the chamber 3, for example a vertical wall. In this case, the system operates by backscattering. The detector 111 is connected to the selection means 12 and to the deduction means 13.

Alternatively, instead of an ultrasonic probe or a gammametry system, an optical probe can be installed for measuring the turbidimetry at different levels.

All the embodiments described above can be combined with one another.

The reactor described in relation to the previous figures may be an SBR batch reactor or a continuous reactor or any other effluent treatment reactor.

A process for the biological treatment of wastewater comprises, in general, all or some of the following phases, that will be referred to as:

FILL phase: admission of the wastewater into the reactor;
REACT phase: biological removal of the pollution (organic, nitrogen and phosphorus); comprises the aeration phases and optionally anaerobic and anoxic phases;
SETTLE phase: separation of the sludge and the treated water by settling of the sludge;
DRAW phase: withdrawal of the treated water.

The selective extraction process preferentially comprises a SETTLE phase wherein the sludge in the reservoir can settle. According to the type of reactor (continuous, SBR, pulsed or nonpulsed, mixed or nonmixed, etc.), this corresponds to an interruption or a reduction of the hydraulic and/or mechanical stirring of the mixture of wastewater and sludge, to an interruption or a reduction of the injection of fluidization gas and/or of aeration gas, etc. The particles which have a strong settling ability reach the lower layers of the sludge, whereas the particles which have a weak settling ability remain in the upper portions of the sludge.

After a period of time sufficient for the settling to take place (for example a period of between 0.1 and 4 hours), the minimum extraction and maximum extraction levels are determined. The extractor extracts the sludge at a first extraction level, between the minimum extraction level and the maximum extraction level for the period of time required to extract the desired amount of sludge. The extractor then withdraws the sludge at a second extraction level, between the minimum extraction level and the maximum extraction level.

The extraction level modification and then the sludge extraction operations are carried out several times.

Advantageously, in order to improve the selection, the stream of extracted sludge can be recycled into the chamber. The selection is in fact improved in this case by repeating the selective extraction process several times.

By way of examples, FIGS. 4A to 4F, 5A to 5F and 6A to 6F present three types of process cycles that can be applied in different reactor types.

A process according to the invention applied to a variable-level SBR reactor is represented in FIGS. 4A to 4F.

The reactor represented comprises two compartments: an anaerobic/anoxic first compartment, termed selector compartment, by which the wastewater is injected with sludge which comes from a recirculation originating from a second compartment, termed principal zone.

The water treatment cycle is composed of FILL and REACT, REACT, SETTLE and DRAW phases of approximately 30 minutes each. The treated water is discharged at the upper level of the reactor (FIG. 4D arrow A) by means of a withdrawal system 4. The maximum height of the liquid in the reactor is approximately six meters and the variable-level extractor 21 is present.

At the end of or during the SETTLE phase, the selective extraction is carried out at several variable levels, between the lower extraction level and the upper extraction level. The extraction level is variable. During the first extraction part (for example, for fifteen minutes), the extracted sludge is either recycled into the chamber (FIG. 4D arrow C), or discharged (FIG. 4E arrow B), in order to remove the weakly settling particles.

A process according to the invention applied to a fixed-level SBR reactor is represented in FIGS. 5A to 5F.

In order to maintain a fixed level, the FILL and DRAW phases take place simultaneously. The wastewater is introduced via the bottom of the chamber (under anoxic or anerobic conditions). The treated water is discharged at the upper level of the reactor (FIG. 5A arrow A) by means of a withdrawal system 4.

Next is the REACT phase wherein the aeration and/or the mixing of the reactor takes place and makes it possible to treat the wastewater.

The selective extraction is carried out, using the extraction means 20, at several variable levels, between the lower extraction level and the upper extraction level, during the final part of the SETTLE period and/or during the next FILL and DRAW phase. During the first extraction part (for example fifteen minutes), the extracted sludge is either recycled into the chamber (FIG. 5E arrow C), or discharged (FIG. 5F arrow B), in order to remove the weakly settling particles.

In the two SBR processes presented, there is a gradual selection of rapidly settling particles, over several repeated cycles.

A process according to the invention applied to a conventional continuous-flow treatment reactor is represented in FIGS. 6A to 6F (for example: conventional activated sludge (CAS), integrated fixed-film activated sludge (IFAS), or membrane biological reactor (MBR)). In these cases, there is no phase or compartment during or in which the sludge can deposit freely and statically. There is continuously an entry of wastewater or of mixture of water and sludge (arrows D), and an exiting of treated water (arrows A) by means of a withdrawal system 4. The aeration reservoir may be intermittently aerated or solely aerated or solely mixed.

In the process according to the invention, the mixing and/or the aeration of the aeration reservoir are interrupted for one to two hours, which allows the sludge to settle at the bottom of said reservoir after a period of time, varying for example between 0.1 and 4 hours (SETTLE phase).

The selective extraction is carried out, using extraction means 20, at several levels, which are variable between the lower extraction level and the upper extraction level, in order to selectively discharge the particles that settle more weakly (FIG. 6E: arrow C for the recycling of the sludge into the reactor and FIG. 6F: arrow B for the discharge of the sludge). During the extraction phase, the height of the extraction can be adjusted.

In all the embodiments presented, the extraction means 20 can also make it possible to extract from the reactor matter that is floating in the water (froth, fat, floating sludge, foam, etc.) in order to prevent accumulation thereof and the inherent problems, this being not only during the settling phase, but also during the other phases. The extraction means can be arranged in such a way that the extraction takes place just below the free level or on the free level of the water in the reactor.

In addition, one (or more) steps of conventional sludge extraction at the bottom of the reactor and/or of sludge recycling may be carried out in parallel to the process according to the invention.

The process will operate all the better and/or will be all the more advantageous if the organisms are capable of developing slowly in the sludge so as to reach a densified structure, such as phosphorus-accumulating organisms (PAOs), denitrifying bacteria or methanogenic bacteria, etc., which goes back to the introduction of the present document.

In addition, the bacteria which perform the "Anammox" process, for anerobic oxidation of $NH_4^+$ ammonium, are capable of developing in dense granules, the copresence of ammonia and nitrite in the absence of oxygen promoting their development. The advantage of these bacteria is that they enable a less expensive oxidation of aqueous ammonia and also a denitrification which consumes less organic matter.

Figure 7:
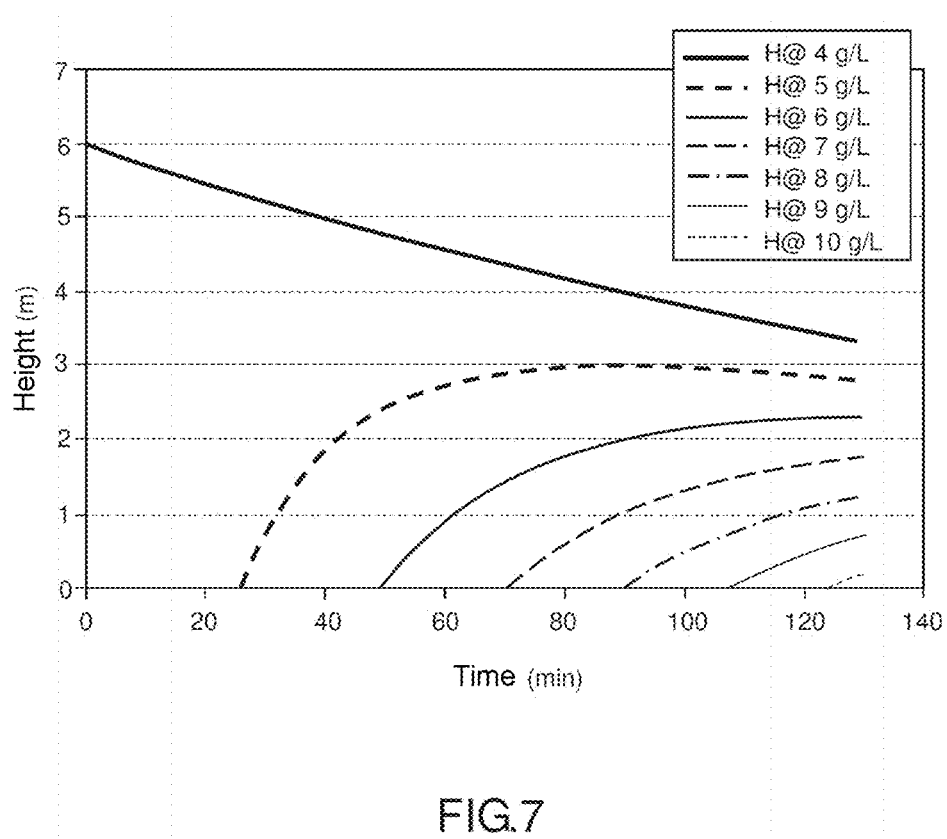
FIG. 7 shows a graph representing the sludge heights according to the sludge concentrations as a function of the settling time, the concentration before settling being 4 g/L.

FIG. 7 shows a graph representing the sludge heights according to the sludge concentrations as a function of the settling time for a given reactor, the concentration before settling being 4 g/L, the extraction being carried out at a higher concentration (5-7 g/L for example).

For this reactor, it is seen that the optimal settling time for extracting the sludge is 130 minutes. The concentration levels are established and it is possible to carry out an efficient selective extraction. It is possible to refine the concentration measurement in order to refine the extraction.

Figure 8A:
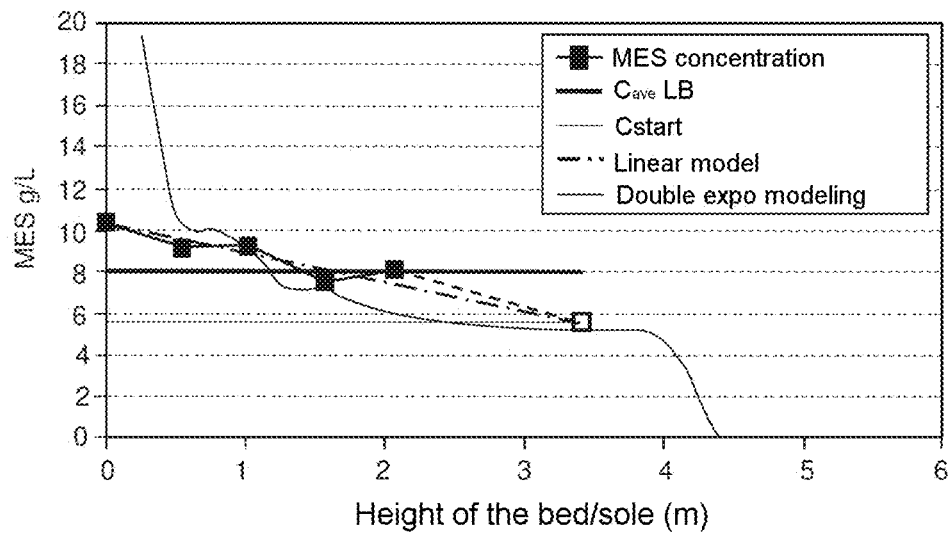
FIGS. 8A and 8B show graphs of sludge concentration, or suspended matter (MES) concentration, in the sludge bed after 110 minutes of settling, obtained for two different reactors R1 (Jougne) and R2 (Pithiviers).
Figure 8B:
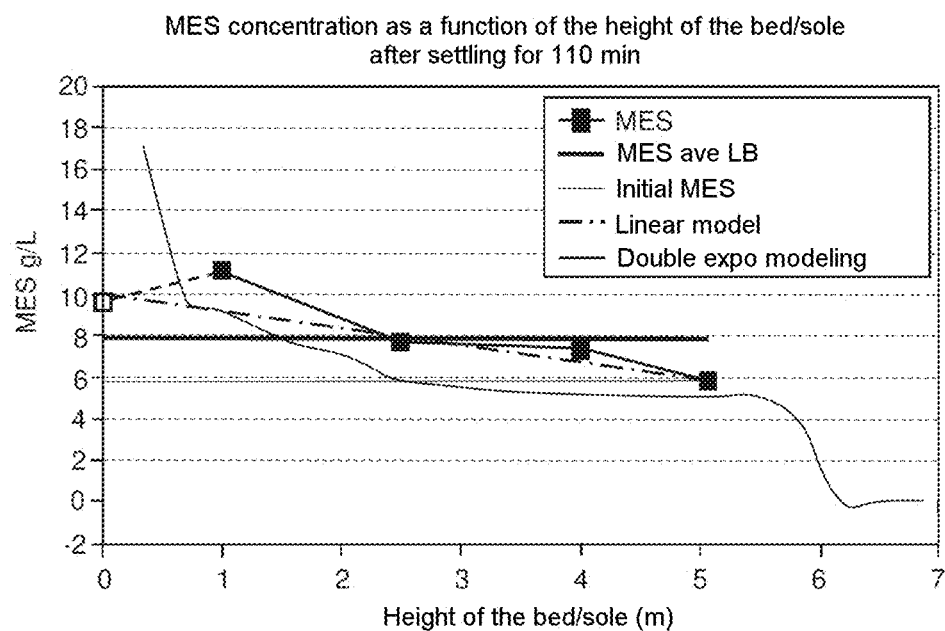

FIGS. 8A and 8B show graphs of sludge concentration, or suspended matter (MES) concentration, in the sludge bed (LB) after 110 minutes of settling, obtained for two different reactors R1 (Jougne) and R2 (Pithiviers).

In the two cases, the concentration measurements make it possible to obtain a linear model by extrapolation of the concentration as a function of the bed height. This model can be used in the determination means 10, in particular the selection means 12, for a given reactor.

The reactor and the process according to the invention can advantageously be applied when denser particles are added to the sludge or produced within said sludge.

For example, activated carbon can be added in the form of dense particles to the sludge. The activated carbon particles can in fact be used for the adsorption of micropollutants, in particular drug residues in the wastewater. The reactor and the process according to the invention, by allowing selective extraction of the least dense sludge and retaining the densest sludge, promote the maintaining of the activated carbon for a longer period of time in the reactor.

The means for determining the extraction levels can be adapted to more precisely target the activated carbon particles: the minimum extraction level will have to be just above the level of sludge containing activated carbon particles so as not to extract the activated carbon with the particles which have a weak settling capacity. Since the residence time of the activated carbon is extended, the adsorption capacity may be higher and/or the amount of activated carbon to be added to the sludge can be reduced.

Another example of advantageous application of the invention relates to the obtaining of struvite ($NH_4MgPO_4$) precipitates. Struvite deposits in a water treatment reactor can cause the exploitation to be highly inefficient because of obstruction of the hoses, pumps and other pieces of equipment, but struvite is another means of exploiting sludge as a slowly assimilated agricultural fertilizer. It is preferable for the struvite, which can be formed when the wastewater contains ammonium, magnesium and phosphates in compatible molar proportions, to remain at the bottom of the reactor and to be recovered from the bottom of the reactor during or after the wastewater treatment. The reactor and the process according to the invention promotes this maintaining of the struvite precipitates in the reactor, it being possible for said precipitates to be recovered during subsequent steps of drawing off and/or treatment (for example of separation with the rest of the dense sludge).

The struvite precipitates can also originate from an anerobic digester effluent, which is transferred into a reactor according to the invention. The aeration and/or the mechanical or hydraulic stirring are interrupted after the REACT phase. The SETTLE phase allows the precipitates to deposit. The selective extraction makes it possible to retain the struvite precipitates in the reactor, preferably at the bottom, so that they can be drawn off and transferred into a dehydration device, in order to produce fertilizer. The means for determining the extraction levels can be adapted to more precisely target the struvite precipitates: the minimum extraction level will have to be located just above the level of sludge containing struvite so as not to extract it with the particles which have a weak settling capacity.

The invention claimed is:

1. A reactor for the biological treatment of wastewater, comprising:
   a chamber capable of containing a mixture of wastewater and sludge comprising a gradient of levels, each level of the gradient of levels corresponding to a particular sludge concentration and/or density, and each level of the gradient of levels corresponding to a specific height within the chamber, wherein a lowest level of the gradient of levels corresponds to the highest sludge concentration and/or densest sludge;
   a selective sludge extraction device configured to determine a minimum level of sludge extraction in the chamber that excludes the lowest level of the gradient of levels and to determine a maximum level of sludge extraction in the chamber, comprising:
      a measurer capable of measuring the sludge concentration and/or density of the gradient of levels of the mixture of wastewater and sludge;
      a selector configured to select a maximum sludge concentration and/or density value and a minimum sludge concentration and/or density value, wherein the selected maximum sludge concentration and/or density value is lower than the sludge and/or density value of the sludge corresponding to the lowest level such that it excludes the lowest level of the gradient of levels, the selector being connected to the measurer
      a deducer connected to the measurer and selector, the deducer configured to determine from the measurements of the measurer a minimum level of sludge extraction corresponding to the selected maximum sludge concentration and/or density value and a maximum level of sludge extraction corresponding to the selected minimum sludge concentration and/or density value; and
      an extractor capable of extracting sludge at variable levels between the minimum level of sludge extraction and the maximum level of sludge extraction.

2. The reactor as claimed in claim 1, further comprising recycling means capable of recycling the extracted sludge into the chamber.

3. The reactor as claimed in claim 1,
   wherein the extractor comprises at least a first portion having at least one opening inside the chamber and a second portion capable of causing the sludge to exit said chamber, and wherein the reactor further comprises:
   variation means capable of varying the position of the at least one opening of the extractor by varying a level of the at least one opening between the minimum level of sludge extraction and the maximum level of sludge extraction.

4. The reactor as claimed in claim 3, the extractor comprising a pump and the variation means comprising means for varying a level of the pump inside the chamber.

5. The reactor as claimed in claim 3, the extractor comprising a tube of which a first end has an opening in the chamber and of which a second end is connected to the second portion of the extractor, the variation means comprising means for moving said tube on either side of its second end in such a way as to modify the position of the first end of said tube.

6. The reactor as claimed in claim 3, the extractor comprising a flexible hose of which a first end has an opening inside the chamber and of which a second end is connected to the second end of the extractor, the variation means comprising means for moving the first end of said flexible hose.

7. The reactor as claimed in claim 6, the means for moving the first end of the flexible hose comprising a component connected to said first end of said flexible hose, said component being capable of cooperating with a screw such that, when the screw is actuated, said component is driven in a vertical movement along said screw.

8. The reactor as claimed in claim 3, the extractor comprising a reservoir connected to the second portion of the extractor and having a slot inside the chamber and comprising a door which has an opening facing said slot, the reservoir and the door being assembled in such a way that no fluid can circulate between them, and the variation means comprising means for moving the door in a substantially vertical movement.

9. The reactor as claimed in claim 3, the extractor comprising a first cylindrical tube which has a substantially rectilinear slot inside the chamber, and a second cylindrical tube which has a substantially helicoidal slot inside the chamber, one of the cylindrical tubes being positioned inside the other and being connected to the second portion of the extractor, the first and second tubes being assembled in such a way that no fluid can circulate between them, the variation means comprising means for turning one of the tubes relative to the other.

10. The reactor as claimed in claim 3, the extractor comprising a set of tubes placed at various levels in the chamber, each tube having a first end which has an opening inside the chamber and a second end which is connected to the second portion of the extractor, the variation means comprising a set of valves capable of opening or closing said tubes.

11. The reactor as claimed in claim 1, wherein the sludge comprising the gradient of levels contains activated carbon and/or struvite; and wherein the selector is configured to select the selected maximum sludge concentration and/or density value such that the selected maximum sludge concentration and/or density value is lower than a level of the gradient of levels containing the activated carbon particles and/or struvite.

* * * * *